United States Patent
Schmotzer et al.

(10) Patent No.: US 9,481,318 B2
(45) Date of Patent: Nov. 1, 2016

(54) SEAT BELT BUCKLE INCORPORATING A DISPLAY

(71) Applicant: FORD GLOBAL TECHNOLOGIES, LLC, Dearborn, MI (US)

(72) Inventors: John William Schmotzer, Canton, MI (US); Matthew Schmotzer, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/677,119

(22) Filed: Apr. 2, 2015

(65) Prior Publication Data
US 2016/0288732 A1    Oct. 6, 2016

(51) Int. Cl.
| | | |
|---|---|---|
| *B60R 11/02* | (2006.01) | |
| *A44B 11/00* | (2006.01) | |
| *A44B 11/25* | (2006.01) | |
| *B60R 16/03* | (2006.01) | |
| *G08B 21/02* | (2006.01) | |
| *B60R 11/00* | (2006.01) | |

(52) U.S. Cl.
CPC .......... *B60R 11/0235* (2013.01); *A44B 11/005* (2013.01); *A44B 11/2561* (2013.01); *B60R 16/03* (2013.01); *G08B 21/02* (2013.01); *B60R 2011/0031* (2013.01); *B60R 2011/0045* (2013.01)

(58) Field of Classification Search
CPC ............ A44B 11/005; A44B 11/2561; B60R 11/0235; B60R 16/03; G08B 21/02
See application file for complete search history.

(56) References Cited

U.S. PATENT DOCUMENTS

| | | | |
|---|---|---|---|
| 7,199,703 B2 | 4/2007 | Okita et al. | |
| 2007/0236917 A1* | 10/2007 | Gray | A44B 11/2546 |
| | | | 362/108 |
| 2009/0322507 A1 | 12/2009 | Aoki et al. | |

FOREIGN PATENT DOCUMENTS

| | | |
|---|---|---|
| CN | 201398538 Y | 2/2010 |
| DE | 20315958 U1 | 12/2003 |

OTHER PUBLICATIONS

English machine translation for CN201398538.
English machine translation for DE20315958.

* cited by examiner

*Primary Examiner* — Leon Flores
(74) *Attorney, Agent, or Firm* — Vichit Chea; King & Schickli PLLC

(57) ABSTRACT

A seat belt buckle for receiving a latch plate of a vehicle seat belt includes a housing having a slot for receiving the latch plate, a locking mechanism within the housing for securing the latch plate within the slot, a display supported by the housing for displaying information and for releasing the latch plate from the locking mechanism when depressed, and a cable connected to a vehicle power source to provide power for the display. The display includes a controller and a transceiver. A method of displaying information within a vehicle includes the steps of: (a) supporting a display with a seat belt buckle housing; (b) receiving data via a transceiver positioned in the seat belt buckle housing; and (c) controlling the information displayed on the display based upon the data received via said transceiver.

20 Claims, 5 Drawing Sheets

SEAT BELT BUCKLE INCORPORATING A DISPLAY

TECHNICAL FIELD

This document relates generally to vehicle seat belt buckles, and more specifically to a seat belt buckle incorporating a display.

BACKGROUND

More and more, new luxury vehicles are incorporating features which add to the ambiance of the interior of the vehicle. One such feature becoming more common is the addition of illuminated seat belt buckles. These illuminated seat belt buckles provide a sense of sophistication for the vehicle and its owner. Current illuminated seat belt buckles are rather simplistic, however, and provide very little, if any, added benefit. This is particularly true in the area of safety. For example, current illuminated buckles do not provide any visual feedback concerning the status of the seat belt buckle (e.g., fastened/unfastened) during the length of a drive. Accordingly, a need exists for an illuminated seat belt buckle that provides any type of information dependent upon conditions relating the vehicle for safety purposes or otherwise.

This document relates to vehicle seat belt buckles that incorporate a display in the buckle. The display is capable of displaying any information and may be utilized to provide safety alerts to the driver and/or passengers. Advantageously, the ability to display information of any nature provides a heightened level of sophistication over the current illuminated buckles and unlimited additional features. The ability to display any information, for example, provides an additional level of safety for vehicle owners and occupants.

SUMMARY

In accordance with the purposes and benefits described herein, a seat belt buckle for receiving a latch plate of a vehicle seat belt is provided. The seat belt buckle may be broadly described as comprising a housing having a slot for receiving the latch plate, a locking mechanism within the housing for securing the latch plate within the slot, a display supported by the housing for displaying information and for releasing the latch plate from the locking mechanism when depressed, and a cable connected to a vehicle power source to provide power for the display.

In accordance with one possible embodiment, the cable is attached along at least a portion of the seat belt between the vehicle power source and the display.

In accordance with another possible embodiment, the display includes a controller, and a transceiver to interface between the controller and a vehicle serial bus.

In accordance with still another possible embodiment, the seat belt buckle further includes a frame supporting the display. In another, the frame slidably receives a first edge of the display and a second edge of the display is secured by the frame with at least one fastener. In yet another, a portion of the frame rotates about an edge of the frame and releases the latch plate from the locking mechanism when at least one of the display and the frame are depressed.

In accordance with an additional aspect, a seat belt buckle for receiving a latch plate of a vehicle seat belt comprises a housing having a slot for receiving the latch plate, a locking mechanism within the housing for securing the latch plate within the slot, and a printed circuit board supporting a display and a controller, a transceiver, and a power source for providing power to the printed circuit board. In this embodiment, the housing supports the printed circuit board, the display releases the latch plate from the locking mechanism when the display is depressed, and the transceiver provides an interface between the controller and a vehicle serial bus.

In accordance with another possible embodiment, the seat belt buckle further includes a frame supporting the display. In another, the frame slidably receives a first edge of the printed circuit board and a second edge of the printed circuit board is secured by the frame with at least one fastener. In still another possible embodiment, a portion of the frame rotates about an edge of the frame and releases the latch plate from the locking mechanism when depressed.

In other possible embodiments, the seat belt buckles described above are incorporated into a vehicle.

In accordance with another aspect, a method of displaying information within a vehicle is provided. The method may be broadly described as comprising the steps of: (a) supporting a display with a seat belt buckle housing; (b) receiving data via a transceiver positioned in the seat belt buckle housing; and (c) controlling the information displayed on the display based upon the data received via the transceiver.

In accordance with another possible embodiment, the display is positioned in a frame, and a portion of the frame rotates about an edge of the frame and releases a latch plate from a locking mechanism within the seat belt buckle housing when the display or the frame are depressed.

In accordance with still another possible embodiment, the transceiver interfaces with a vehicle serial bus and the data is received from a body control module via the vehicle serial bus. In yet another, the data received via the transceiver includes data relating to a vehicle key fob proximity, and further comprising the step of displaying information on the display upon receiving data indicating a presence of the vehicle key fob.

In accordance with yet another possible embodiment, the data received via the transceiver includes data relating to a sensed occupancy of a vehicle seat, and the method further includes the step of displaying information on the display upon receiving data indicating an occupancy of a vehicle seat.

In accordance with another possible embodiment, the data received via the transceiver includes data relating to a seat belt status, and the method further includes the step of illuminating the display with a red color upon receiving data indicating the occupancy of the vehicle seat when the seat belt status is unfastened. In still another embodiment, the data received via the transceiver includes data relating to a seat belt status, and the method further includes the step of illuminating the display with a green color upon receiving data indicating the occupancy of the vehicle seat when the seat belt status is fastened.

In the following description, there are shown and described several preferred embodiments of the seat belt buckle for receiving a latch plate of a vehicle seat belt and the related methods of displaying information within a vehicle. As it should be realized, the vehicles and method are capable of other, different embodiments and their several details are capable of modification in various, obvious aspects all without departing from the assemblies and method as set forth and described in the following claims.

Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the seat belt buckle for receiving a latch plate of a vehicle seat belt and related method of displaying information, and together with the description serve to explain certain principles thereof. In the drawing figures.

Reference will now be made in detail to the present embodiments of the seat belt buckle for receiving a latch plate of a vehicle seat belt and related methods of displaying information, examples of which are illustrated in the accompanying drawing figures, wherein like numerals are used to represent like elements.

DETAILED DESCRIPTION

Figure 1:
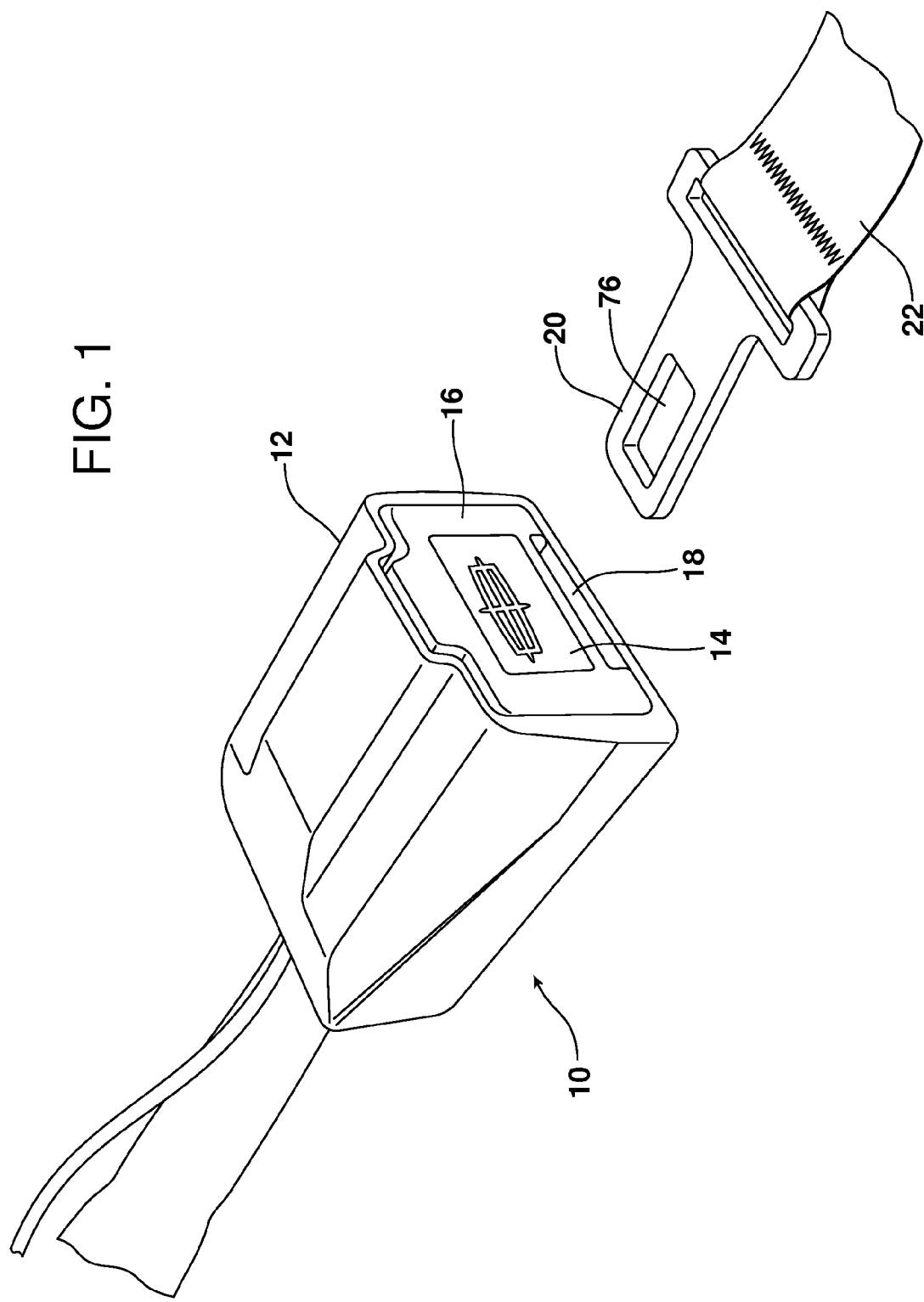
FIG. 1 is a perspective view of a seat belt buckle and a vehicle latch plate and seat belt received by the housing in normal operation.

Reference is now made to FIG. 1, which broadly illustrates an embodiment of seat belt buckle 10 having a housing 12, a display 14, and a frame 16 supporting the display. A slot 18 is formed in the housing 12 beneath the display 14 for receiving a latch plate 20 of a vehicle seat belt 22 in a customary manner.

As shown, the display 14 is illuminated and displaying information in the form of a logo. In the described embodiment, the display 14 is a fully functional liquid crystal display (LCD) with a 96×64 pixel screen. Of course, other types of displays and screens (e.g., light emitting diode, plasma, etc.) could be used so long as the devices are capable of displaying information.

Figure 2:
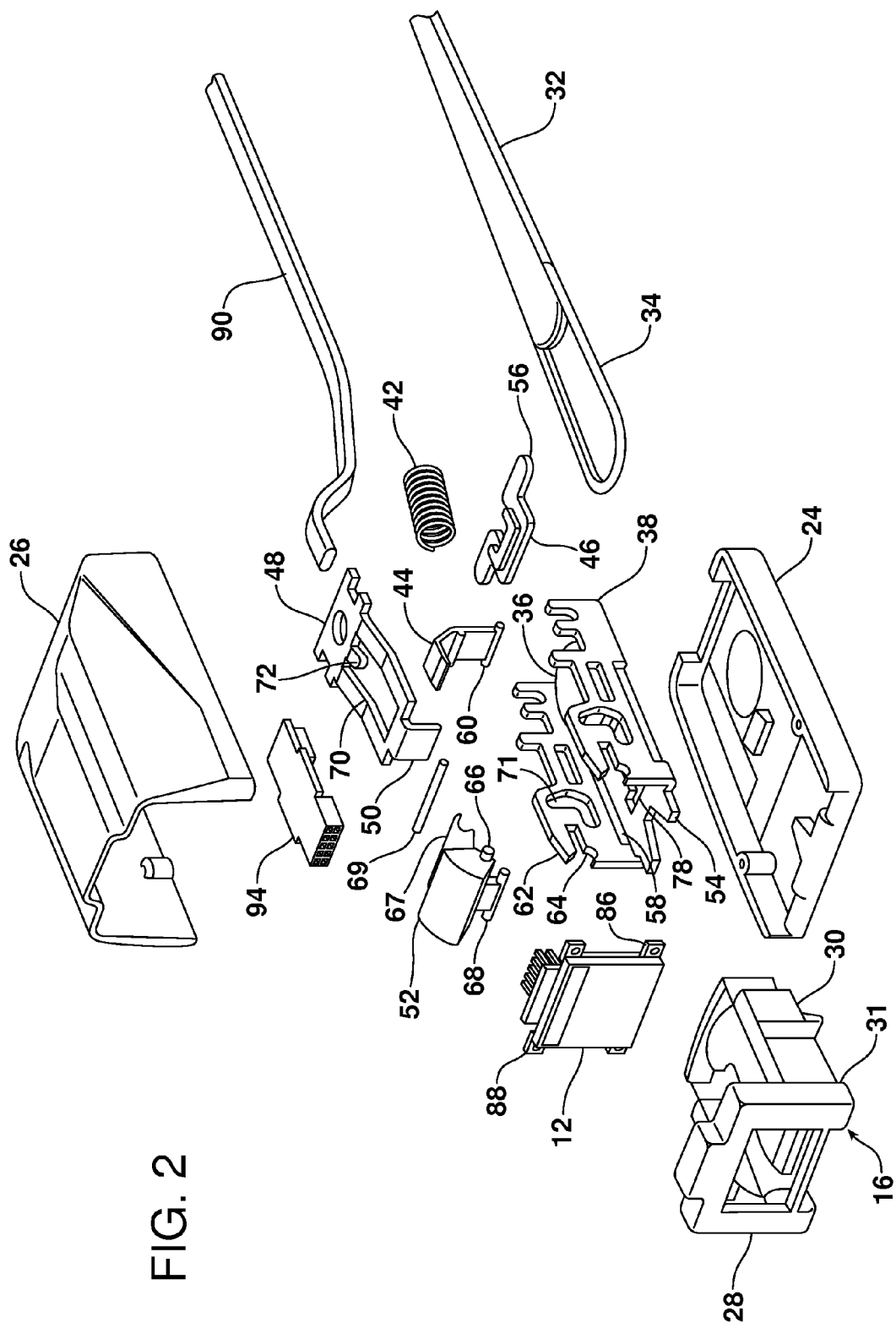
FIG. 2 is an exploding perspective view of the seat belt buckle.

The seat belt buckle 10 and its component parts are shown in additional detail in the exploding view of FIG. 2. In the described embodiment, the housing 12 includes a base 24 and a removable top 26. The top 26 may be secured to the base via a snap fit mechanism or with fasteners. The frame 16 includes a front pivoting portion 28 and a rear base portion 30 generally supported by the base 24. The front pivoting portion 28 frames or borders the display 12 (as shown in FIG. 1) that is attached thereto as will be described in more detail below.

In the described embodiment, the front pivoting portion 28 and the rear base portion 30 are connected by a living hinge 31 allowing the front pivoting portion to rotate about an axis formed by the hinge. Rotation of the front pivoting portion 28 operates to release the latch plate 20 from a locking mechanism when the display 14 and/or its supporting frame 16 are depressed. In other words, pressing on an upper portion of the display 14 or on the front pivoting portion 28 of the frame 16 forces the frame and display to pivot or rotate about the axis formed by the living hinge 31 thereby releasing the latch plate 20 from the buckle 10.

As further illustrated in FIG. 2, a seat belt harness 32 is secured within the seat belt buckle 10. In the described embodiment, the seat belt harness 32 includes a loop 34 that is positioned around a post 36 of a mounting frame 38 and secured in this position. The mounting frame 38 is secured within housing 12 and supported by base 24. A portion of the mounting frame 38 extends within the rear base portion 30 of the frame 16. It is important to note that the manner of securing the seat belt harness to the buckle may take any form known in the art in accordance with the broad principles of the invention.

As indicated above, the locking mechanism releasably secures the latch plate 20 within the slot 18. In the described embodiment, the locking mechanism includes a spring 42, a release lever 44, a release lever base 46, a locking plate 48 having a downward facing tang 50, and a latch 52. More specifically, the lever base 46 is positioned on a floor 54 of the mounting frame 38. Ends 56 of the lever base 46 extend through slots 58 formed in both sides of the mounting frame 38. A fulcrum 60 of the release lever 44 is secured by the release lever base 46 allowing the release lever 44 to pivot about the fulcrum 60 in response to contact by the latch 52.

The latch 52 is itself supported by the mounting frame 38. More specifically, a pair of arms 62 extends from the mounting frame and forms a pair of slots 64. Projections 66 extending from both sides of the latch 52 are supported within the slots 64 that provide a track for the projections to follow during movement of the latch. The latch 52 also includes a fulcrum 68 secured by the mounting frame 38 allowing the latch 52 to pivot about the fulcrum 68 in response to contact by frame 16/display 14. Latch 52 further includes a pair of arms 67 which extend towards and receive a rod 69. The rod 69 is positioned for movement through contact with the pair of arms 67 within a backwards L-shaped cutout 71 in the mounting frame 38. The rod 69 is held is position by lever 44 and the rear base portion 30 of the frame 16.

Figure 3:
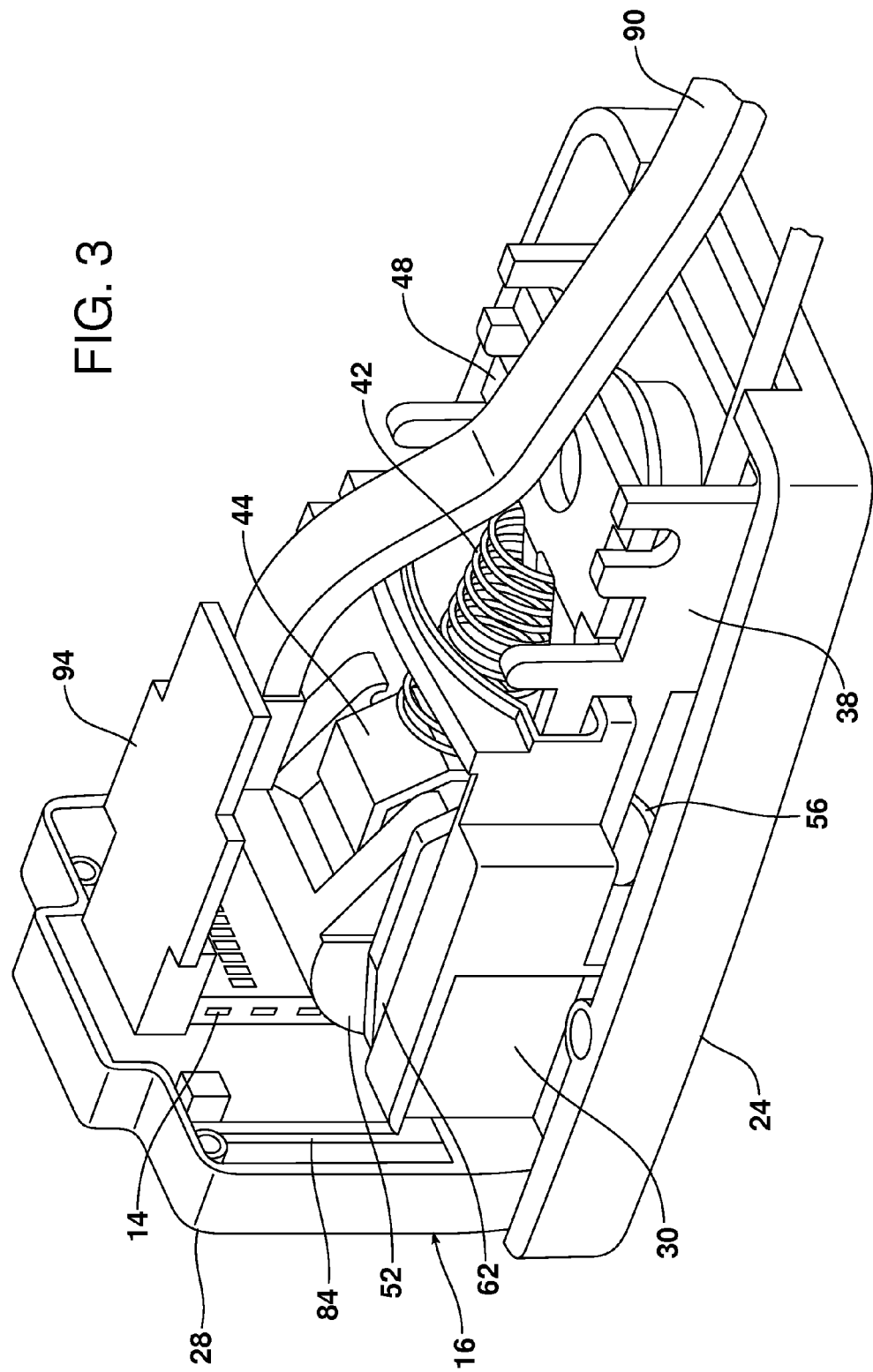
FIG. 3 is a partial perspective view of an assembled seat belt buckle with the a housing top removed omitted for clarity.

The spring 42 is positioned at least partially within a rectangular aperture 70 formed in the locking plate 48. A tab 72 extending into the aperture 70 retains one end of the spring 42. The second end of the spring 42 is similarly retained by a tab 74 extending from the lever 44 (not shown). Situated between the locking plate 48 and lever 44, the spring 42 provides a bias against the lever which maintains the locking plate in a downward, locked position. More specifically, the tang 50 extending from locking plate 48 is forced downward and through an aperture 76 in the latch plate 20 (shown in FIG. 1) and maintained by the spring bias. Another aperture 78 formed in the bottom of the mounting frame 38 receives the tang 50 in this position, i.e., a fastened state. FIG. 3 provides a partial assembled view of the above-described seat belt buckle 10 with the housing top 26 removed for clarity.

In operation, the seat belt latch plate 20 is slid into slot 18 forcing the release lever base 46 to move rearward and to contact the release lever 44 causing the release lever to rotate forward about fulcrum 60. This forward rotation of the release lever 44 causes it to contact rod 69 forcing the rod downward within the L-shaped cutout 71 until the rod is below slots 64. This movement forces lock plate 48 downward such that tang 50 is within aperture 70 of the latch plate 20. In this position, the latch plate 20 is secured within the seat belt buckle 10 in the fastened state.

When it is desired to unfasten the seat belt, a force is applied to the display 14 and/or frame 16 causing the display/frame to rotate and contact the latch 52. The latch 52 is rotated about fulcrum 68 the latch and rod 69 are moved upward within L-shaped slots 71. This movement creates contact with lever 44 causing it to rotate about fulcrum 60 and compress spring 42 thereby overcoming the bias and allowing the tang 50 to be released from aperture 76 in the latch plate 20. This movement is sufficient to release the seat belt latch plate 20 from the seat belt buckle 10 in an unfastened state. It is important to note, however, that the locking mechanism within the seat belt buckle may take any form known in the art in accordance with the broad principles of the invention.

Figure 4:
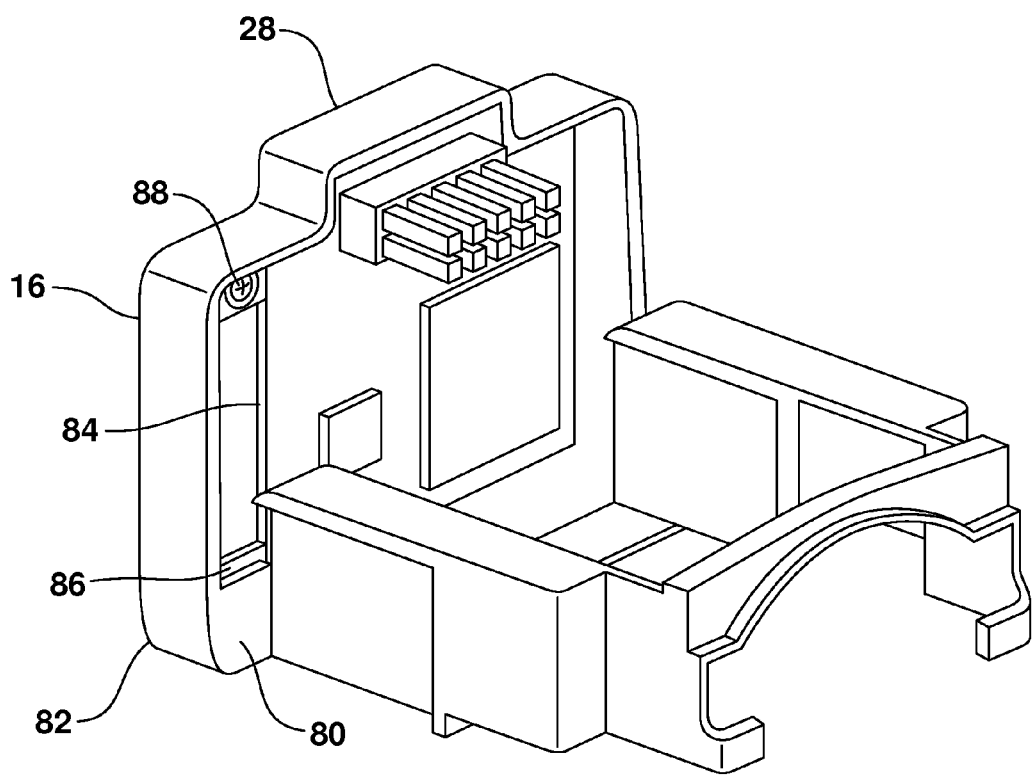
FIG. 4 is a partial perspective view of a frame supporting the display.

Turning now to FIG. 4, a slot 80 is shown formed front pivoting portion 28 of frame 16. The slot 80 is formed along a lower portion 82 of the front pivoting portion 28 for slidably receiving the display 14. This may include receiving an edge of the display or a housing for the display, or an edge of a printed circuit board on which the display may be mounted. In the described embodiment, the display 14 is mounted on a printed circuit board 84. An edge 86 of the printed circuit board 84 is slid into the slot 80. Although not shown, a second slot is formed opposite slot 80 and likewise receives the edge 86 of the printed circuit board 84. The printed circuit board 84 is attached to frame 16 using fasteners (e.g., screws) adjacent an upper edge 88. In this manner, the display 14, frame 16, and printed circuit board 84 form an assembly that moves as a unit when a force is applied to the display and/or frame. In other embodiments, the display may have an internal printed circuit board and a housing of the display may have an edge suitable for capture within the slots 80.

Referring back to FIG. 2, a cable 90 is attached along at least a portion of the seat belt harness 32 between a vehicle power source (not shown) and the buckle 10 via a shrink wrap (not shown) or like material. Of course, other methods of attaching a cable to a seat belt harness may be utilized. Alternative embodiments may include a seat belt harness with an integral cable positioned within or molded as a unitary piece or the cable 90 may be attached to the seat belt harness 32 along an entirety of the length of the harness. Even more, the seat belt buckle 10 may include its own power source and wirelessly communicate with the vehicle and more specifically, the vehicle body control module(s), thereby eliminating the need for a cable altogether.

Figure 5:
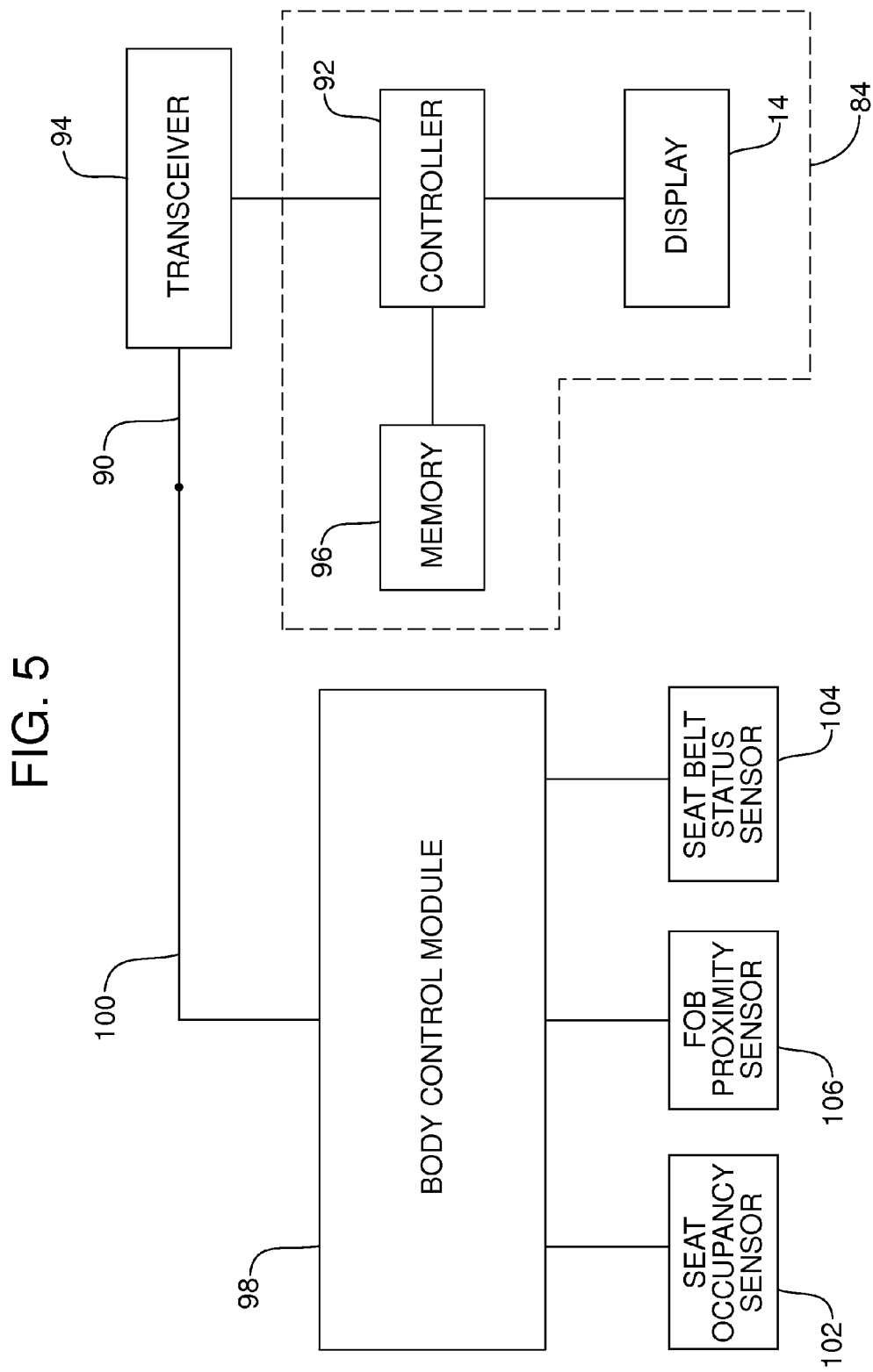
FIG. 5 is a circuit diagram broadly showing the how the display is connected to the vehicle, including the body control module.

The seat belt buckle 10 further includes a micro controller 92 and a transceiver 94 to interface between the controller and a vehicle serial bus (shown in FIG. 5). In the described embodiment, the transceiver 94 is connected between the cable 90 and the micro controller 92. More importantly, the display 14, the micro controller 92, and memory 96 are mounted on the printed circuit board 84. Alternate embodiments could utilize a display wherein the controller, memory and display are contained in a housing forming a single unit with a connector mating with the transceiver. Other embodiments could place the micro controller and memory on a separate printed circuit board that does not move with the frame 14 when depressed.

As shown in FIG. 5, a vehicle body control module 98 provides input data that controls the information displayed on the display 14. The information may be graphics, for example, stored in the memory 96. The vehicle body control module 98 interfaces with the micro controller 92 via the vehicle serial bus 100 (e.g., a controller area network or CAN bus). More specifically, data is transmitted along cable 90 (e.g., a USB cable) between the vehicle serial bus 100 and the transceiver 94. The transceiver 94 passes data to the micro controller 92 which in turn illuminates the display 14 to display certain information.

The vehicle body control module 98 is responsible for monitoring and controlling various electronic accessories in a vehicles' body. For instance, a seat occupancy sensor 102 for detecting whether a seat is occupied may signal the vehicle body control module 98 regarding its status. Similarly, a seat belt status sensor 104 for detecting whether a seat belt is fastened or unfastened may signal the vehicle body control module 98 or a key fob proximity sensor 106 for detecting the presence of a key fob near the vehicle may signal the vehicle body control module. In the described embodiment, these three electronic accessories 102, 104, and 106 are monitored by the vehicle body control module 98 and affect the information being displayed by the seat belt buckle display 14. Other embodiments of the invention may rely on the status of any of the electronic accessories typically monitored by a vehicle body control module to determine what information will be displayed.

Even more, the transceiver 94 of the described embodiment may include Bluetooth® technology, WI-FI technology, infrared or other wireless methods of communicating with the vehicle or with external sources. For example, a tweet received by a vehicle occupant's Twitter® account could trigger a notification to be displayed on the display 14. The notification could take any form of information including, for example, the word TWITTER, or the Twitter bird logo, or simply the color light blue associated with Twitter. The same could be done for other social media alerts, weather alerts, AMBER alerts, car maintenance alerts, low tire pressure alerts, or any information.

In another aspect of the invention, a method of displaying information within a vehicle includes the steps of supporting a display 14 with a seat belt buckle housing 12, receiving data via a transceiver 94 positioned in the seat belt buckle 10, and controlling the information displayed on the display based upon the data received via the transceiver. In the described method, the display 14 is positioned in a frame 16, and a portion 28 of the frame rotates about a living hinge 31 of the frame and releases a latch plate 20 from a locking mechanism of the seat belt buckle when the display or the frame are depressed.

The data, as described in more detail above, includes data relating to vehicle key fob proximity, vehicle seat occupancy, and seat belt status in the described method. More specifically, the data received via the transceiver 94 includes data form a vehicle body control module 98 relating to a sensed occupancy of a vehicle seat, and further includes the step of illuminating the display 14 upon receiving data indicating a presence of the vehicle key fob.

Even more, the data received via the transceiver 94 includes data relating to a seat belt fastened status. Upon receiving data indicating the occupancy of a seat and a seat belt unfastened signal, the display 14 is then illuminated with a solid red color. On the other hand, upon receiving data indicating the occupancy of a seat and a seat belt fastened signal, the display 14 is then illuminated with a solid green color. Again, as described in more detail above, the transceiver 94 can receive information from the vehicle body control module or other remote sources using wireless technology or thru direct connection to the micro controller 92. In each instance, data is received by a transceiver 94 positioned in the seat belt buckle 10 and information displayed on the display 14 based upon the data received via the transceiver 94 is controlled.

In summary, numerous benefits result from providing a display supported by a vehicle seat belt buckle for displaying information. The illuminated seat belt buckles provide a sense of sophistication for the vehicle owner and add a certain ambiance to the interior of the vehicle. Even more, displayed information can take any form including, for example, information concerning vehicle safety. In this manner, vehicle occupants can be alerted to various conditions concerning the interior or exterior of the vehicle and even conditions unrelated to the vehicle.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A seat belt buckle for receiving a latch plate of a vehicle seat belt, comprising:
    a housing having a slot for receiving the latch plate;
    a locking mechanism within said housing for securing the latch plate within the slot;
    a display supported by said housing for displaying information and for releasing the latch plate from said locking mechanism when depressed; and
    a receiver for receiving data that controls the information displayed on said display.

2. The seat belt buckle for receiving a latch plate of a vehicle seat belt of claim 1, further comprising a cable connected to a power source to provide power to said display.

3. The seat belt buckle for receiving a latch plate of a vehicle seat belt of claim 2, wherein said data is provided via said cable to said receiver.

4. The seat belt buckle for receiving a latch plate of a vehicle seat belt of claim 1, further comprising a frame supporting said display.

5. The seat belt buckle for receiving a latch plate of a vehicle seat belt of claim 4, wherein said frame slidably receives a first edge of said display and a second edge of said display is secured by said frame with at least one fastener.

6. The seat belt buckle for receiving a latch plate of a vehicle seat belt of claim 4, wherein a portion of said frame rotates about an edge of said frame and releases the latch plate from said locking mechanism when at least one of said display and said frame are depressed.

7. The seat belt buckle for receiving a latch plate of a vehicle seat belt of claim 6, wherein said display includes a controller, and said receiver provides an interface between said controller and a vehicle serial bus.

8. A vehicle incorporating the seat belt buckle for receiving a latch plate of a vehicle seat belt of claim 1.

9. A seat belt buckle for receiving a latch plate of a vehicle seat belt, comprising:
    a housing having a slot for receiving the latch plate;
    a locking mechanism within said housing for securing the latch plate within the slot;
    a printed circuit board supporting a display and a controller, said housing supporting said printed circuit board, and said display releasing the latch plate from said locking mechanism when said display is depressed;
    a transceiver providing an interface between said controller and a vehicle serial bus; and
    a power source for providing power to said printed circuit board.

10. The seat belt buckle for receiving a latch plate of a vehicle seat belt of claim 9, further comprising a frame supporting said display.

11. The seat belt buckle for receiving a latch plate of a vehicle seat belt of claim 10, wherein said frame slidably receives a first edge of said printed circuit board and a second edge of said printed circuit board is secured by said frame with at least one fastener.

12. The seat belt buckle for receiving a latch plate of a vehicle seat belt of claim 11, wherein a portion of said frame rotates about an edge of said frame and releases the latch plate from said locking mechanism when depressed.

13. A vehicle incorporating the seat belt buckle for receiving a latch plate of a vehicle seat belt of claim 9.

14. A method of displaying information within a vehicle comprising the steps of:
    supporting a display with a seat belt buckle housing;
    receiving data via a transceiver positioned in said seat belt buckle housing; and
    controlling the information displayed on said display based upon the data received via said transceiver.

15. The method of displaying information within a vehicle of claim 14, wherein said display is positioned in a frame, and wherein a portion of said frame rotates about an edge of said frame and releases a latch plate from a locking mechanism within said seat belt buckle housing when said display or said frame are depressed.

16. The method of displaying information within a vehicle of claim 14, wherein said transceiver interfaces with a vehicle serial bus and said data is received from a body control module via the vehicle serial bus.

17. The method of displaying information within a vehicle of claim 14, wherein the data received via said transceiver includes data relating to a vehicle key fob proximity, and further comprising the step of displaying information on said display upon receiving data indicating a presence of the vehicle key fob.

18. The method of displaying information within a vehicle of claim 14, wherein the data received via said transceiver includes data relating to a sensed occupancy of a vehicle seat, and further comprising the step of displaying information on said display upon receiving data indicating an occupancy of a vehicle seat.

19. The method of displaying information within a vehicle of claim 18, wherein the data received via said transceiver includes data relating to a seat belt status, and further comprising the step of illuminating said display with a red color upon receiving data indicating the occupancy of the vehicle seat when the seat belt status is unfastened.

20. The method of displaying information within a vehicle of claim 18, wherein the data received via said transceiver includes data relating to a seat belt status, and further comprising the step of illuminating said display with a green color upon receiving data indicating the occupancy of the vehicle seat when the seat belt status is fastened.

* * * * *